(No Model.) 2 Sheets—Sheet 1.
F. A. BUNNELL.
FILTER.
No. 492,134. Patented Feb. 21, 1893.
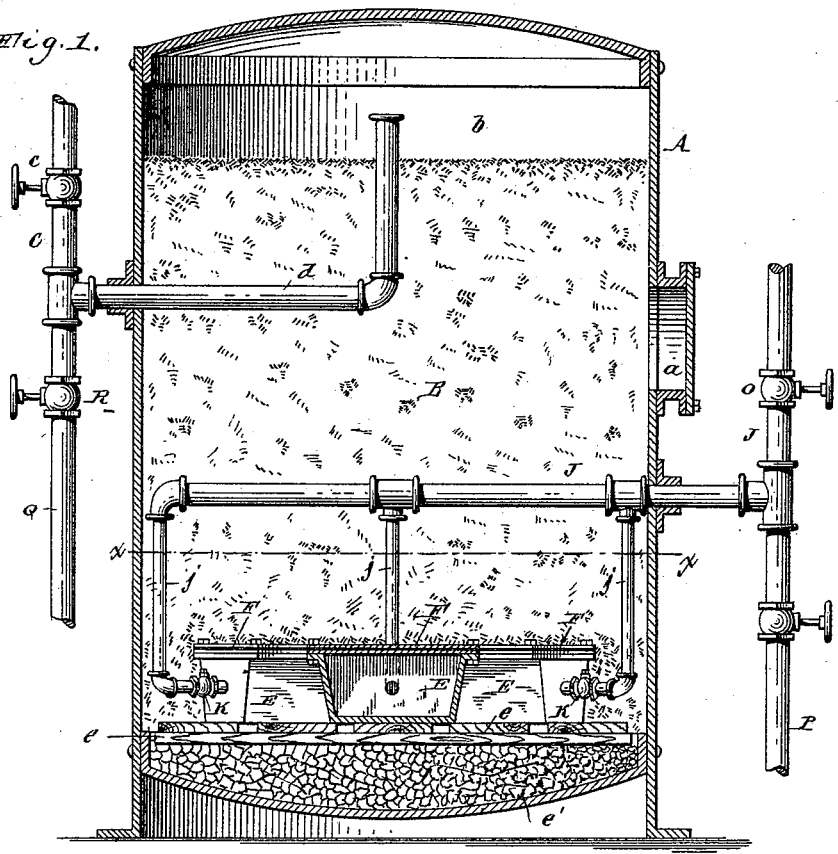
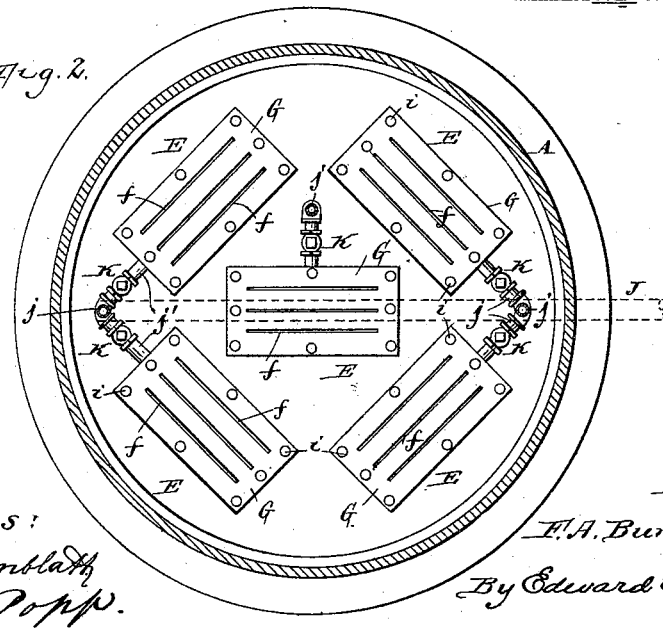
Witnesses:
Jacob Nussenblatt
Theo. L. Popp.
Inventor.
F. A. Bunnell.
By Edward Wilhelm
Attorney (No Model.) 2 Sheets—Sheet 2.
F. A. BUNNELL.
FILTER.
No. 492,134. Patented Feb. 21, 1893.
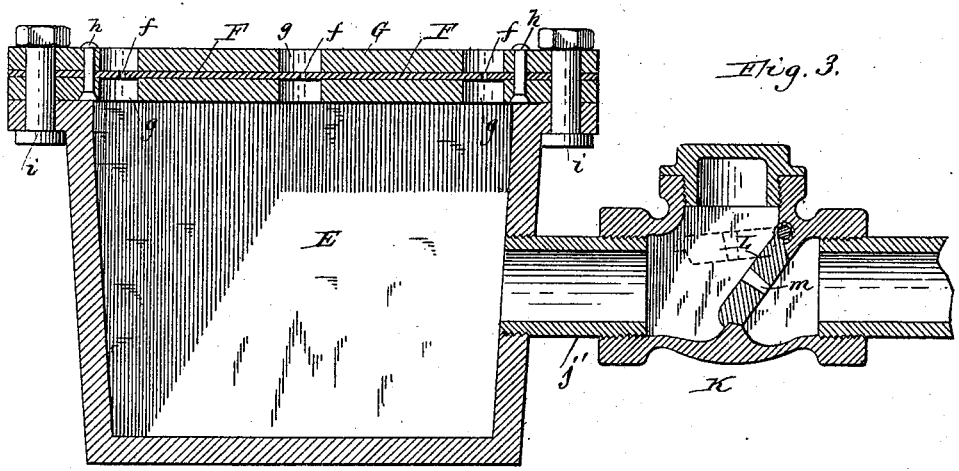
Fig. 3.
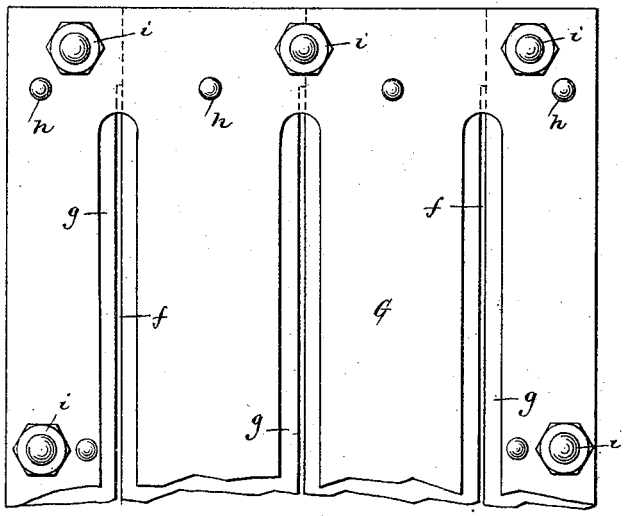
Fig. 4.
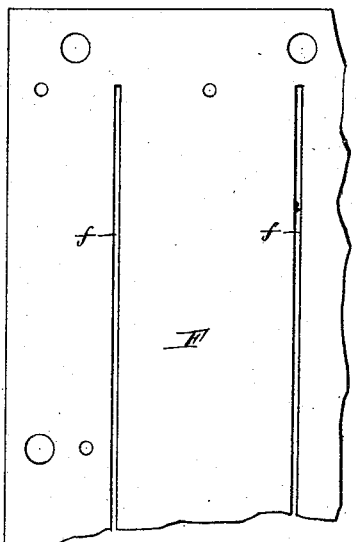
Fig. 5.
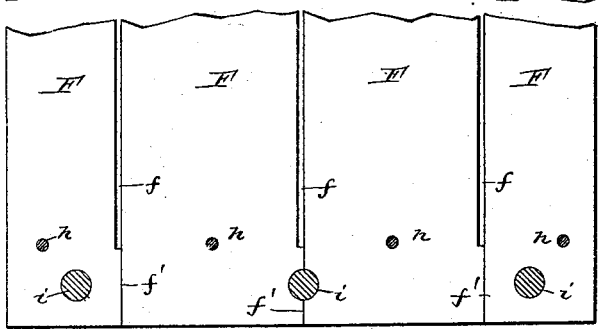
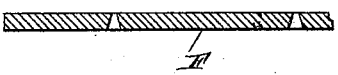
Fig. 6.
Witnesses:
Jacob Nussenblatt
Theo. L. Popp
Francis A. Bunnell, Inventor.
By Edward Wilhelm,
Attorney.

UNITED STATES PATENT OFFICE.

FRANCIS A. BUNNELL, OF SYRACUSE, NEW YORK, ASSIGNOR TO CHRISTOPHER C. BRADLEY AND MARY E. BUNNELL, OF SAME PLACE.

FILTER.

SPECIFICATION forming part of Letters Patent No. 492,134, dated February 21, 1893.

Application filed March 22, 1890. Serial No. 344,981. (No model.)

*To all whom it may concern:*

Be it known that I, FRANCIS A. BUNNELL, a citizen of the United States, residing at Syracuse, in the county of Onondaga and State of New York, have invented a new and useful Improvement in Filters, of which the following is a specification.

This invention relates to that class of filters in which the water or other liquid to be purified percolates through a body of sand, gravel or other granular filtering material and which are provided with a chamber covered with perforated metal which supports the body of filtering material and through which the purified liquid passes into said chamber.

The objects of my invention are to improve the construction of the diaphragm which separates the filtering material from the water chamber and to provide a simple support for the water chamber within the filter shell.

In the accompanying drawings consisting of two sheets, Figure 1 is a sectional elevation of a water filter provided with my improvements. Fig. 2 is a horizontal section in line $x$—$x$, Fig. 1. Fig. 3 is a vertical cross section of one of the filtrate chambers on an enlarged scale. Fig. 4 is a fragmentary top plan view of the same partly in section. Fig. 5 is a top plan view showing a modified construction of the diaphragm. Fig. 6 is a cross section of the same.

Like letters of reference refer to like parts in the several figures.

A represents the upright cylindrical chamber or shell which contains the body B of filtering material, such as sand, charcoal, &c., and which is provided with a man hole $a$ in its side wall.

C represents the water supply pipe provided with a hand valve $c$ and $d$ a branch pipe which enters the side of the cylinder from the supply pipe C and opens above the filtering medium. A clear space $b$ is left in the upper end of the cylindrical chamber so as to allow the entering impure water to distribute itself over the filtering medium.

E represents a number of independent chambers arranged in the bottom of the filtering cylinder and adapted to receive the filtered water which has percolated through the filter bed. These chambers are preferably supported on a false bottom or grate $e$ formed by a number of boards secured to each other and resting on a bed of coarse gravel $e'$ which is placed in the concave bottom of the filtering cylinder. This manner of constructing a false bottom forms a very simple horizontal support for the water chambers above the concave bottom of the filtering cylinder.

The top of each water chamber is formed by a perforated cover or diaphragm which consists of thin slitted plates F of copper or other suitable metal and supporting plates G arranged above and below the slitted plates and provided with slots opposite the slits of the latter. The slits $f$ of the thin plates are preferably formed by arranging a number of strips or narrow plates edge to edge with the greater portion of one of the edges of each strip cut away or recessed, as represented in Fig. 4, so that when the several strips rest against each other with their end portions $f'$ the recessed portion of one strip will be slightly separated from the edge of the adjacent strip and form a narrow slit. The thicker supporting plates G between which the thin plates or strips are secured are provided with large slots $g$ above and below the slits $f$. The slitted plates F and their supporting plates G are preferably secured together by rivets $h$ and then secured to the top of the water chamber by means of bolts $i$ so as to permit of ready removal for cleansing and other purposes.

The slitted copper plates forming the diaphragm are sufficiently thin to permit very narrow and shallow slits to be formed between them. This prevents any of the solid filtering material from being carried downwardly by the current of water into the slits and clog the same and obstruct the passage of the filtered water. The fine slits in the diaphragm are very long and narrow so as to provide very minute and elongated passages for the filtered water having a comparatively large aggregate area. But while the thin diaphragm is very desirable because it permits of very shallow slits being formed therein for the passage of the filtered water it is liable to be broken and destroyed by the weight of the filtering material and the pressure of the water. This, however, is avoided by the slotted supporting plates arranged on opposite sides of the slitted diaphragm and protecting the latter against upward and downward pressure. By constructing the diaphragm of copper corrosion in the fine slits and the consequent liability of the clogging of these parts is avoided. If desired, the diaphragm can be formed out of one piece of sheet metal with the slits cut therein, as represented in Fig. 5. When the filtering material or the water pressure is very heavy so as to necessitate the employment of heavier material for the slitted diaphragm the slits in the latter can be formed so as to diverge downwardly, as shown in Fig. 6, thereby avoiding the clogging which would result in a comparatively deep slit having parallel sides.

J represents a delivery pipe arranged horizontally in the filter bed and provided with branch pipes $j$ which connect with each of the independent water chambers E.

K represents a check valve employing a swinging gate L and arranged in the lower horizontal portion $j'$ of each branch pipe $j$.

The water to be filtered enters the upper part of the cylinder through the supply pipe, percolates through the body of filtering material and passes through the slitted diaphragms into the water chambers, where it collects in a purified state.

During the operation of filtering the gate of the check valve is kept closed by the water pressure, as represented in Fig. 3 in full lines, and the filtered water escapes slowly through an opening $m$ formed in the gate L.

The several independent water chambers discharge the filtered water through the common delivery pipe J which is provided with a valve O.

For the purpose of washing the filter the current is reversed by supplying water from a wash pipe P. This opens the gate of the check valve, as indicated in dotted lines in Fig. 3, and allows a free passage of the water upwardly through the filter.

By forming the diaphragm of slitted sheet metal it is rendered very durable and a sufficient aggregate area of interstices is provided to permit the water to flow readily and at the same time retain the filtering material.

By constructing the filter with several independent water compartments the capacity of the filter can readily be increased or diminished by increasing or diminishing the number of compartments and the construction of the filter is rendered very simple, durable and inexpensive.

I claim as my invention—

1. The combination with the filtering chamber, of a filter diaphragm composed of thin strips of metal arranged side by side and having their adjacent edges slightly separated, whereby narrow and shallow slits are formed between the strips for the passage of the filtered liquid, and a supporting plate having slots which are of greater width than said slits and arranged in line therewith, substantially as set forth.

2. The combination with the shell containing the filtering material and provided with a concave bottom, of water inlet and outlet pipes, water receiving chambers connected with said outlet pipe, and a horizontal grating or support resting on a gravel bed in the concave bottom of said shell and supporting said water chambers, substantially as set forth.

Witness my hand this 13th day of March, 1890.

FRANCIS A. BUNNELL.

Witnesses:
THEO. L. POPP,
JACOB NUSSENBLATT.